(12) United States Patent
Chen et al.

(10) Patent No.: US 10,069,834 B2
(45) Date of Patent: Sep. 4, 2018

(54) USING MOBILE DEVICES AS GATEWAYS FOR INTERNET OF THINGS DEVICES

(71) Applicant: Verizon Patent and Licensing Inc., Arlington, VA (US)

(72) Inventors: Ming Chen, Bedford, MA (US); Dahai Ren, Lincoln, MA (US); Matthew J. Threefoot, Columbia, MD (US); Dongchen Wang, Concord, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 193 days.

(21) Appl. No.: 15/131,632

(22) Filed: Apr. 18, 2016

(65) Prior Publication Data

US 2017/0302669 A1    Oct. 19, 2017

(51) Int. Cl.

| | |
|---|---|
| *H04L 29/06* | (2006.01) |
| *H04W 4/00* | (2018.01) |
| *H04W 4/02* | (2018.01) |
| *H04W 12/06* | (2009.01) |
| *H04W 12/08* | (2009.01) |
| *H04W 4/38* | (2018.01) |

(52) U.S. Cl.
CPC .............. *H04L 63/10* (2013.01); *H04L 63/08* (2013.01); *H04W 4/006* (2013.01); *H04W 4/023* (2013.01); *H04W 4/38* (2018.02); *H04W 12/06* (2013.01); *H04W 12/08* (2013.01)

(58) Field of Classification Search
CPC ..... H04L 9/0838; H04L 9/0841; H04L 63/08; H04L 63/10; G06F 21/33; G06F 21/445; H04W 4/023; H04W 12/06; H04W 12/08

USPC .......... 726/2–7; 713/168–171, 173, 175, 178
See application file for complete search history.

(56) References Cited

U.S. PATENT DOCUMENTS

| | | | |
|---|---|---|---|
| 8,276,343 B2 * | 10/2012 | Yang | ................... E04F 15/02 52/509 |
| 8,886,948 B2 * | 11/2014 | Schmidt | ............ H04L 63/061 380/44 |
| 2013/0173331 A1 | 7/2013 | Mohagheghi et al. | |
| 2013/0254151 A1 | 9/2013 | Mohagheghi et al. | |

(Continued)

OTHER PUBLICATIONS

Yinbiao et al., "Internet of Things: Wireless Sensor Networks," http://www.iec.ch/whitepaper/pdf/iecWP-internetofthings-LR-en.pdf, Jul. 31, 2014, 78 pages.

(Continued)

*Primary Examiner* — Hosuk Song

(57) ABSTRACT

A mobile device may include first and second communication interfaces. The mobile device may receive, from another device, a dispatch message to receive data from an Internet of Things (IoT) device. The mobile device may send, to the other device and based on the dispatch message, a device key. The mobile device may receive, from the other device, a session ticket generated by the other device. The IoT device may have previously received a copy of the session ticket. The mobile device may send the session ticket to the IoT device. The mobile device may receive data, from the IoT device and via the first communication interface, based on the session ticket matching the copy of the session ticket. The mobile device may format the data for transmission via the second communication interface. The mobile device may send, via the second communication interface, the data to a network device.

20 Claims, 6 Drawing Sheets

(56) References Cited

U.S. PATENT DOCUMENTS

2014/0285154 A1 9/2014 Mohagheghi et al.
2015/0271296 A1* 9/2015 Borzycki ............ G06F 21/6218
 709/202
2017/0237742 A1* 8/2017 Salmela ................ H04L 63/101
 726/4

OTHER PUBLICATIONS

Gruman, "Skip the hub; your mobile device is your IoT gateway," http://www.infoworld.com/article/2834560/internet-of-things/your-mobile-device-internet-of-things-gateway.html, Oct. 21, 2014, 6 pages.
Abou-Zeid, "Predictive Radio Access Networks for Vehicular Content Delivery," http://www.collectionscanada.gc.ca/obj/thesescanada/vol2/OKQ/TC-OKQ-12162.pdf, Apr. 2014, 184 pages.
Zachariah et al., "The Internet of Things Has a Gateway Problem," http://iot.stanford.edu/pubs/zachariah-gateway-hotmobile15.pdf, Feb. 12, 2015, 6 pages.
Wikipedia, "Crowdsourcing," https://en.wikipedia.org/wiki/Crowdsourcing, Mar. 11, 2016, 22 pages.
Wikipedia, "Kerberos (protocol)," https://en.wikipedia.org/wiki/Kerberos_(protocol), Feb. 6, 2016, 7 pages.
Microsoft, "Session Tickets," https://msdn.microsoft.com/en-us/library/windows/desktop/aa380136%28v=vs.85%29.aspx, Apr. 5, 2016, 2 pages.
Microsoft, "Key Distribution Center," https://msdn.microsoft.com/en-us/library/windows/desktop/aa378170%28v=vs.85%29.aspx, Apr. 5, 2016, 2 pages.
Microsoft, "Ticket-Granting Tickets," https://msdn.microsoft.com/en-us/library/windows/desktop/aa380510%28v=vs.85%29.aspx, Apr. 5, 2016, 1 page.
Bernat, "Speeding up SSL: enabling session reuse," http://vincent.bernat.im/en/blog/2011-ssl-session-reuse-rfc5077.html, Sep. 27, 2011, 10 pages.
Neuman et al., "RFC 4120: The Kerberos Network Authentication Service (V5)," https://tools.ietf.org/html/rfc4120, https://tools.ietf.org/html/rfc4120, Jul. 2005, 138 pages.
Salowey et al., "RFC 5077: Transport Layer Security (TLS) Session Resumption without Server-Side State," https://tools.ietf.org/html/rfc5077, Jan. 2008, 20 pages.
Wikipedia, "ZigBee," https://en.wikipedia.org/wiki/ZigBee, Mar. 13, 2016, 8 pages.
Wikipedia, "Bluetooth low energy," https://en.wikipedia.org/wiki/Bluetooth_low_energy, Mar. 22, 2016, 10 pages.

* cited by examiner

US 10,069,834 B2

USING MOBILE DEVICES AS GATEWAYS FOR INTERNET OF THINGS DEVICES

BACKGROUND

The Internet of Things (IoT) may refer to a network of physical objects or "things" embedded with electronics, software, sensors, and/or network connectivity, which enables these objects to collect and exchange data. The Internet of Things allows objects to be sensed and controlled remotely across a network, creating opportunities for more direct integration between the physical world and computer-based systems, and resulting in improved efficiency, accuracy, and economic benefit.

BRIEF DESCRIPTION OF THE DRAWINGS

FIG. 4 is a flow chart of an example process for using mobile devices as IoT gateways for IoT devices.

DETAILED DESCRIPTION OF PREFERRED EMBODIMENTS

The following detailed description of example implementations refers to the accompanying drawings. The same reference numbers in different drawings may identify the same or similar elements.

The Internet of Things may include a vast variety of IoT devices (e.g., the "things"). IoT devices may be resource-constrained (e.g., have limited computational, storage, communication, and/or power resources), may communicate on varying schedules with infrequent bursts of data, and may be geographically dispersed, the combination of which may make it infeasible to use dedicated gateways for communication with IoT devices. Due to their movement and large numbers, mobile devices may be able to function as IoT gateways for IoT devices (e.g., by crowdsourcing from a large number of potentially available mobile devices). Crowdsourcing may be a process of obtaining needed services, ideas, or content by soliciting contributions from a large group of people, and especially from an online community, rather than from traditional suppliers. However, the movement of mobile devices, which may make mobile devices suitable potential gateways for IoT devices, may also result in a limited available connection time (e.g., the time during which a mobile device is close enough to exchange data with an IoT device). In addition, using unaffiliated mobile devices (e.g., crowdsourced mobile devices that may not be controlled by an operator of the IoT devices) may result in security concerns with regard to the unaffiliated mobile devices and/or the data from the IoT devices. Implementations described herein may enable dynamically and securely establishing a session between a mobile device and an IoT device. Dynamically and securely establishing a session between a mobile device and an IoT device may enable using mobile devices as IoT gateways for IoT devices.

Figure 1A:
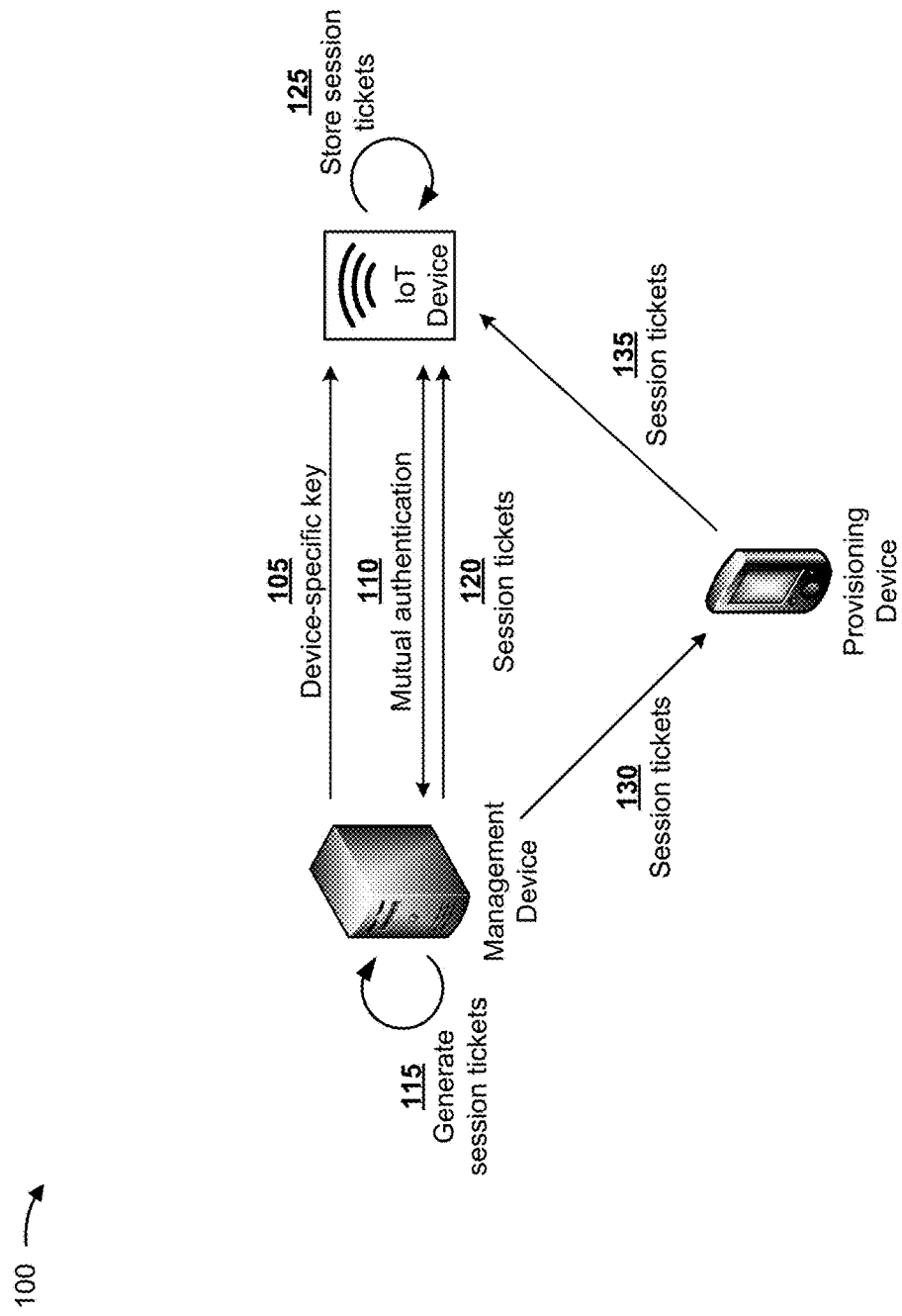
FIGS. 1A-1C are diagrams of an overview of an example implementation described herein.
Figure 1B:
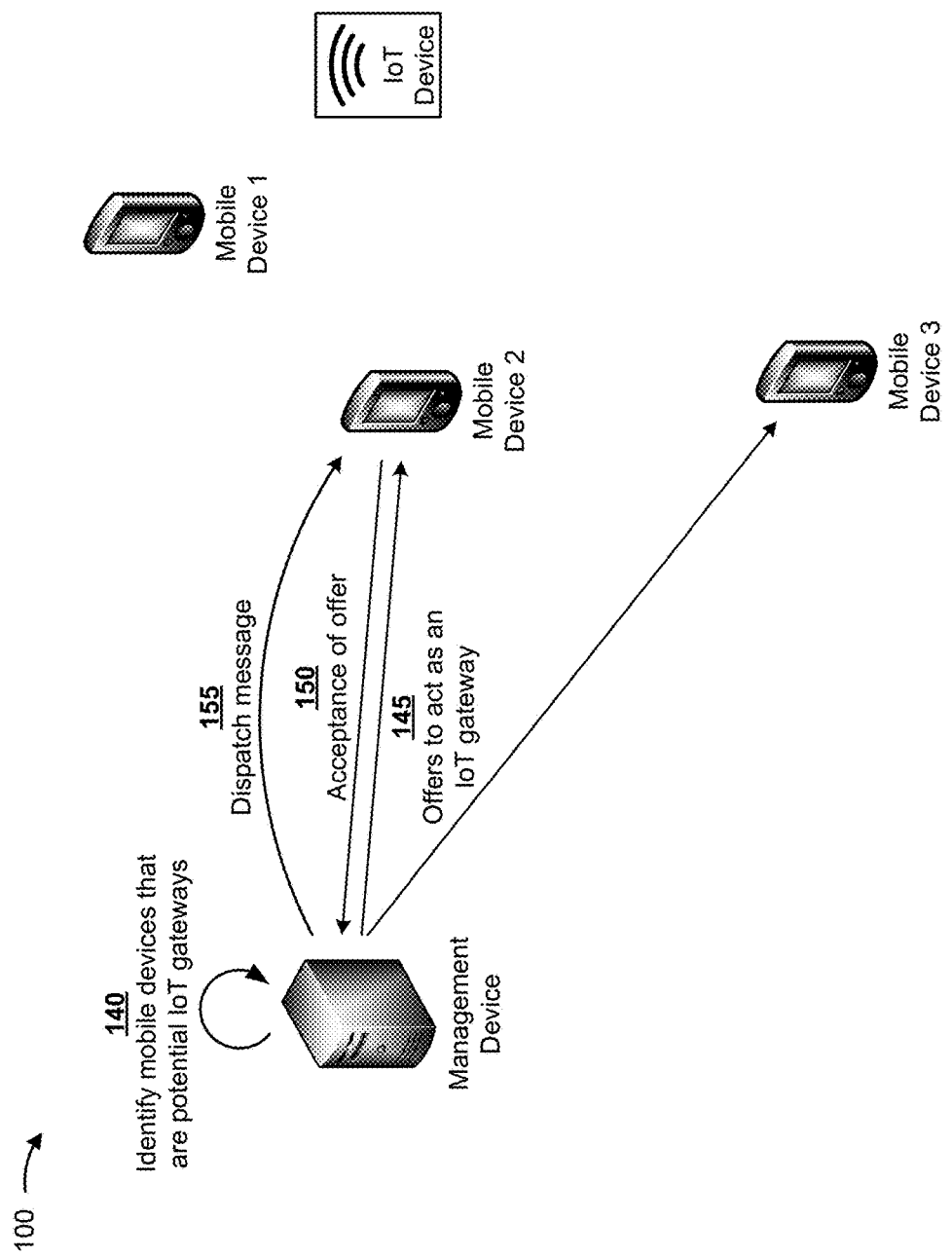
Figure 1C:
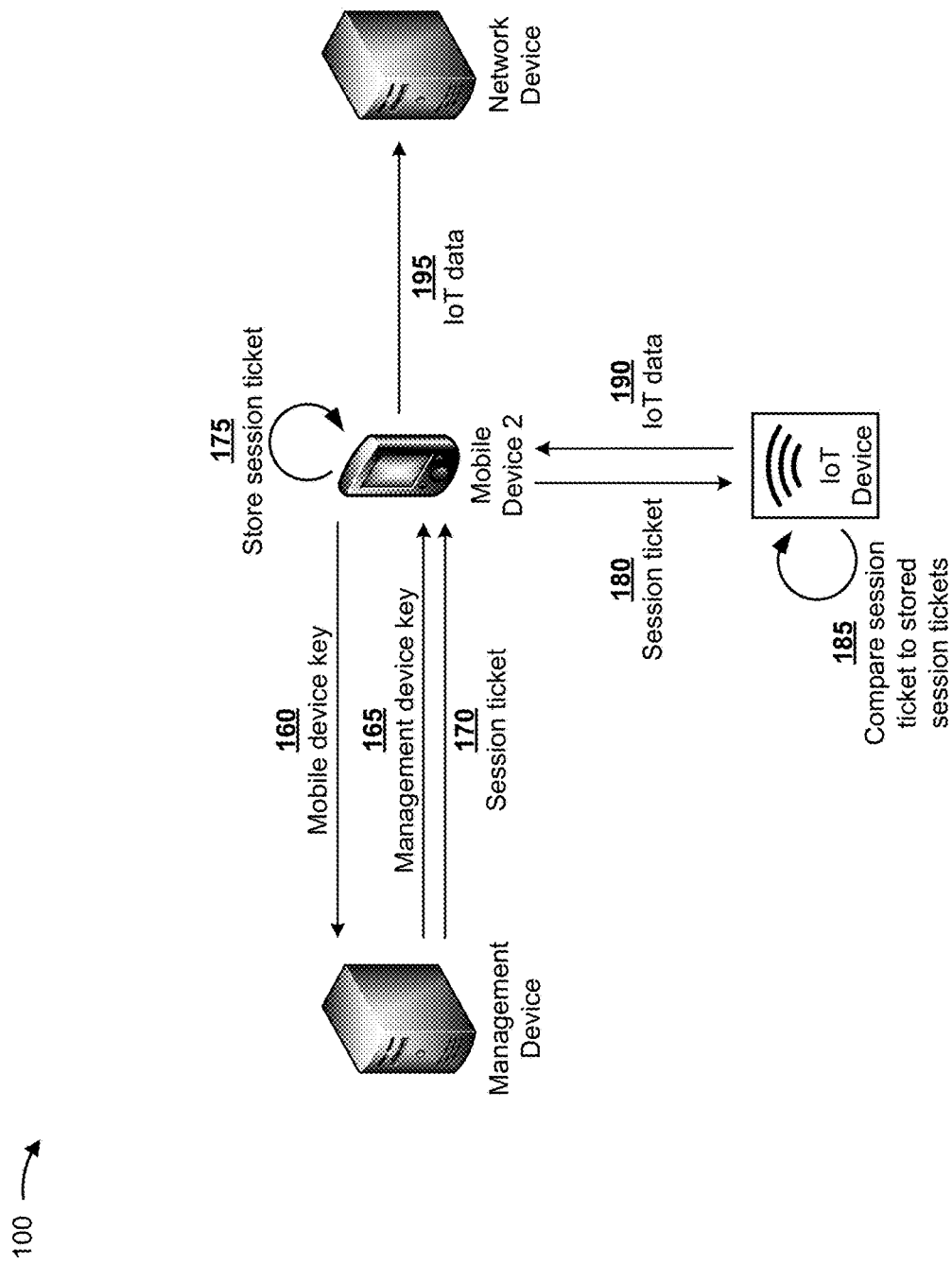

FIGS. 1A-1C are diagrams of an overview of an example implementation 100 described herein. As shown in FIG. 1A, assume that a management device is to provision an IoT device to use a mobile device as an IoT gateway, and that the management device has generated a device-specific key for the IoT device.

As shown in FIG. 1A and by reference number 105, the management device may send the device-specific key to the IoT device. As shown by reference number 110, the management device and the IoT device may mutually authenticate each other (e.g., based on the device-specific key). After the management device and the IoT device mutually authenticate each other, the management device may generate a set of session tickets (e.g., a character string that IoT device may use to verify that a mobile device is authorized to act as an IoT gateway) for the IoT device (as shown by reference number 115) and send the session tickets to the IoT device (as shown by reference number 120). As shown by reference number 125, the IoT device may store the session tickets that were received from the management device.

In some implementations, the management device may send the session tickets to a provisioning device, as shown by reference number 130. The provisioning device may send the session tickets to the IoT device (as shown by reference number 135) when the provisioning device is near enough to communicate with the IoT device.

As shown in FIG. 1B, assume that the management device is to identify which, if any, of mobile device 1, mobile device 2, or mobile device 3 may be able to act as an IoT gateway for the IoT device. As shown by reference number 140, the management device may identify mobile devices that are potential IoT gateways for the IoT device. As further shown in FIG. 1B, assume that the management device has determined that mobile device 2 and mobile device 3, but not mobile device 1, are potential IoT gateways for the IoT device. For example, predicted mobility information for mobile device 2 and mobile device 3 may indicate that mobile device 2 and mobile device 3 may be near the IoT device when the IoT device is to transfer IoT data.

As shown by reference number 145, the management device may send, to mobile device 2 and mobile device 3, offer messages requesting that mobile device 2 and/or mobile device 3 act as an IoT gateway for the IoT device. In some implementations, the offer messages may include information regarding incentives (e.g., a reduced price for wireless services, a credit for additional minutes of data usage, a credit reducing prior minutes of data usage, free data service, a discount on a telecom bill, coupons or vouchers for goods and/or services, or the like) associated with accepting the offer.

As further shown in FIG. 1B, assume that mobile device 2 (or a user of mobile device 2) has decided to accept the offer to act as an IoT gateway for the IoT device. Based on the decision to accept the offer, mobile device 2 may send an acceptance message to the management device, as shown by reference number 150. Based on receiving the acceptance message from mobile device 2, the management device may send a dispatch message to mobile device 2, as shown by reference number 155. The dispatch message may include information and/or instructions to enable mobile device 2 to act as an IoT gateway for the IoT device.

As shown in FIG. 1C, assume that mobile device 2 has received a dispatch message from the management device. As shown by reference number 160, and based on the dispatch message, mobile device 2 may send a mobile device key to the management device so that mobile device 2 may authenticate itself to the management device. As shown by reference number 165, the management device may send a management device key to mobile device 2 so that the management device may authenticate itself to mobile device 2.

As further shown in FIG. 1C, assume that the management device has authenticated mobile device 2 and determined that mobile device 2 is authorized to act as an IoT gateway for the IoT device. Based on determining that mobile device 2 is authorized to act as an IoT gateway for the IoT device, the management device may send a session ticket to mobile device 2, as shown by reference number 170. As shown by reference number 175, mobile device 2 may store the session ticket (e.g., until mobile device 2 is near enough to the IoT device that mobile device 2 may communicate with the IoT device).

As further shown in FIG. 1C, assume that mobile device 2 is near enough to the IoT device that mobile device 2 may communicate with the IoT device, such that mobile device 2 may send the session ticket to the IoT device (as shown by reference number 180). As shown by reference number 185, the IoT device may compare the session ticket received from mobile device 2 to the stored session tickets (e.g., the session tickets that the IoT device received from the management device) to determine whether the session ticket received from mobile device 2 matches any of the stored session tickets.

As further shown in FIG. 1C, assume that the IoT device has determined that the session ticket received from mobile device 2 matches a stored and unexpired session ticket, such that the IoT device may send IoT data to mobile device 2 (as shown by reference number 190). When mobile device 2 receives the IoT data from the IoT device, mobile device 2 may send the IoT data to a network device, as shown by reference number 195.

In this way, implementations described herein may enable dynamically and securely establishing a session between a mobile device and an IoT device. Dynamically and securely establishing a session between a mobile device and an IoT device may enable using mobile devices as IoT gateways for IoT devices, which may reduce the need for dedicated IoT gateways. Implementations described herein may conserve the IoT device's potentially limited computational, storage, communication, and/or power resources by shifting some authentication, authorization, encryption, and/or decryption tasks to a management device. Implementations described herein may use precomputed session tickets to reduce the time to establish a session between an IoT device and a mobile device that is acting as an IoT gateway, which may enable using a greater portion of the available connection time for data transfer. Implementations described herein may improve data security by using session tickets that expire based on a predetermined time-to-live (TTL), which may prevent replay attacks based on reuse of the session tickets.

As indicated above, FIGS. 1A-1C are provided merely as an example. Other examples are possible and may differ from what was described with regard to FIGS. 1A-1C.

Figure 2:
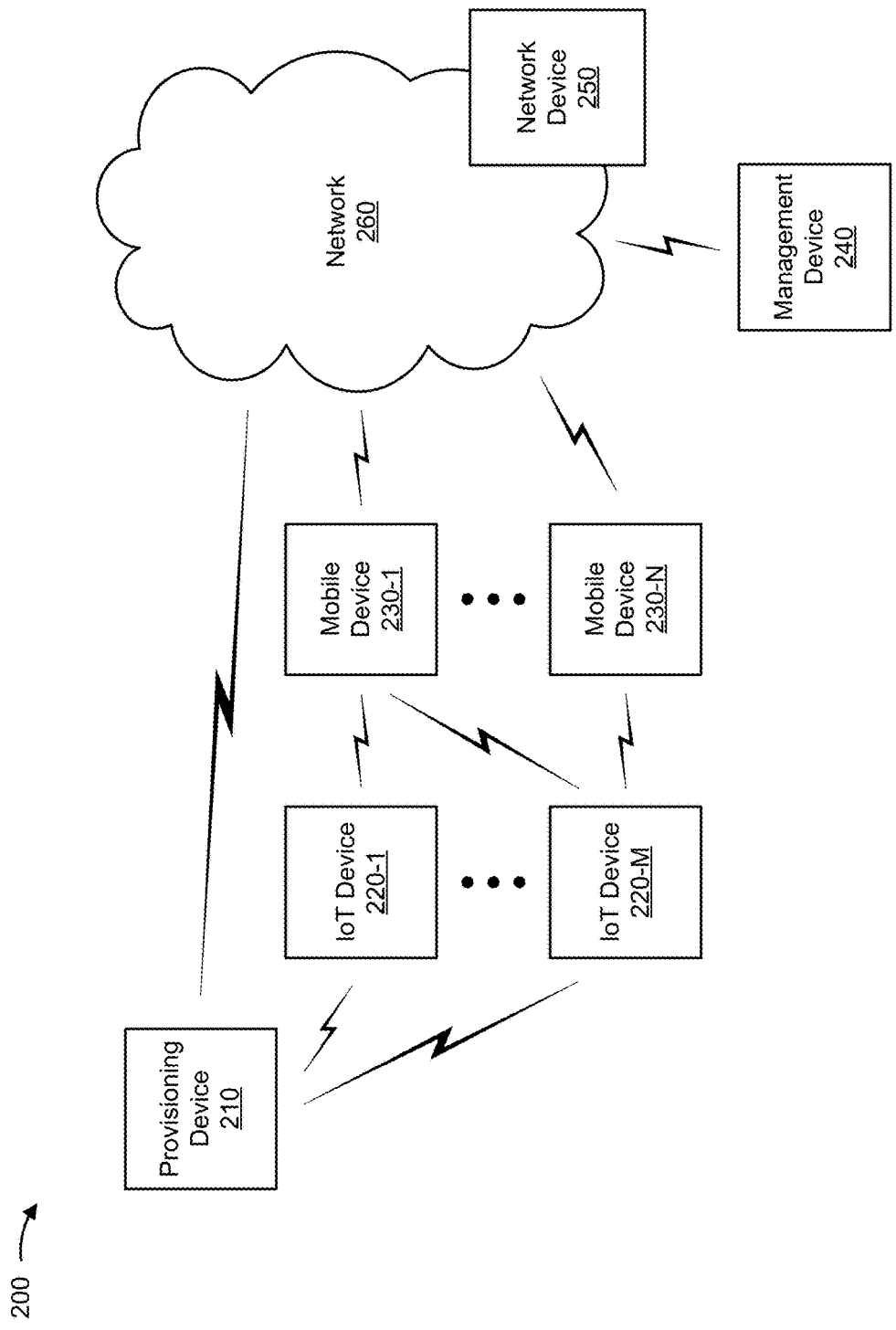
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a provisioning device 210, one or more IoT devices 220-1 through 220-M (M≥1) (hereinafter referred to collectively as "IoT devices 220," and individually as "IoT device 220"), one or more mobile devices 230-1 through 230-N (N≥1) (hereinafter referred to collectively as "mobile devices 230," and individually as "mobile device 230"), a management device 240, a network device 250, and a network 260. Devices of environment 200 may interconnect via wired connections, wireless connections, or a combination of wired and wireless connections.

Provisioning device 210 includes one or more devices capable of receiving, processing, and/or providing information. For example, provisioning device 210 may include a wireless communication device, a radiotelephone, a personal communications system (PCS) terminal (e.g., that may combine a cellular radiotelephone with data processing and data communications capabilities), a smart phone, a computing device (e.g., a desktop computer, a laptop computer, a tablet computer, a handheld computer, a personal gaming system, or the like), a wearable communication device (e.g., a pair of smart eyeglasses or a smart watch), a machine device, and/or a similar device. In some implementations, provisioning device 210 may receive security keys and/or session tickets from management device 240 and may provide the security keys and/or session tickets to IoT devices 220. In some implementations, provisioning device 210 may be mobile, such that provisioning device 210 may be moved to be near IoT devices 220 (e.g., to provide the security keys and/or session tickets to IoT devices 220). In some implementations, provisioning device 210 may include an interface for low-power wireless communication (e.g., Bluetooth low energy, ZigBee (based on the Institute of Electrical and Electronics Engineers (IEEE) 802.15.4 standard), or the like) that may allow provisioning device 210 to receive information from and/or transmit information to IoT device 220.

IoT device 220 includes one or more devices capable of gathering, receiving, storing, processing, providing, and/or transmitting information and/or data. For example, IoT device 220 may include a network device (e.g., a modem, a switch, a gateway, or the like), a sensing device, a metering device, a mobile phone (e.g., a smart phone, a radiotelephone, or the like), a computing device (e.g., a server, a desktop computer, a laptop computer, a tablet computer, a handheld computer, a camera, an audio recorder, a camcorder, or the like), an appliance (e.g., a thermostat, an oven, a refrigerator, a microwave, a stove, or the like), a medical device, a biometric device, a wearable device, an automobile, an airplane, a railcar, a light bulb, a switch, an actuator, a timer, a signal detection device (e.g., to detect the presence of a signal, such as a Bluetooth signal, an infrared signal, or the like), a machine-to-machine (M2M) device, and/or a similar device. In other words, IoT device 220 may be any "thing" in the IoT. In some implementations, IoT device 220 may include an interface for low-power wireless communication (e.g., Bluetooth low energy, IEEE 802.15.4 ZigBee, or the like) that may allow IoT device 220 to receive information from and/or transmit information to another device in environment 200.

Mobile device 230 includes one or more devices capable of communicating via a network (e.g., network 260). For example, mobile device 230 may include a wireless communication device, a radiotelephone, a PCS terminal (e.g., that may combine a cellular radiotelephone with data processing and data communications capabilities), a smart phone, a laptop computer, a tablet computer, a personal gaming system, a wearable communication device (e.g., a pair of smart eyeglasses or a smart watch), a machine device, an automobile, an airplane, a railcar, and/or a similar device. Mobile device 230 may send traffic to and/or receive traffic from network 260 (e.g., via a suitable wireless access point or a base station associated with a cellular network, such as an evolved Node B (eNB) associated with a long-term evolution (LTE) network). In some implementations, mobile devices 230 may assist with transferring data from IoT devices 220 to network device 250, as described in more detail elsewhere herein. In some implementations, mobile devices 230 may perform authentication, authorization, encryption, and/or decryption functions for IoT device 220. In some implementations, mobile device 230 may include a first communication interface for communicating via a network (e.g., network 260) and a second communication interface for low-power wireless communication (e.g., Bluetooth low energy, IEEE 802.15.4 ZigBee, or the like) that may allow mobile device 230 to receive information from, and/or transmit information to, IoT device 220.

Management device 240 includes one or more devices capable of receiving, processing, and/or providing information. For example, management device 240 may include a computing device (e.g., a desktop computer, a laptop computer, a tablet computer, a handheld computer, a server computer, a smart phone, a gaming device, a computer cluster, a cloud computer, or the like). In some implementations, management device 240 may perform authentication, authorization, encryption, and/or decryption functions for IoT device 220. In some implementations, management device 240 may authenticate mobile device 230. In some implementations, management device 240 may identify mobile devices 230 as potential IoT gateways for IoT device 220, as described elsewhere herein. In some implementations, management device 240 may send, to mobile devices 230, offers to act as IoT gateways for IoT device 220. In some implementations, management device 240 may receive, from mobile devices 230, acceptances based on the offers to act as IoT gateways for IoT device 220. In some implementations, management device 240 may dispatch (e.g., by sending instructions and/or information) mobile device 230 to act as an IoT gateway for IoT device 220.

Network device 250 includes one or more devices (e.g., one or more traffic transfer devices) capable of processing and/or transferring traffic between provisioning device 210, IoT device 220, mobile device 230, management device 240, and/or the remainder of network 260. For example, network device 250 may include a firewall, a router, a gateway, a switch, a hub, a bridge, a reverse proxy, a server (e.g., a proxy server), a security device, an intrusion detection device, a load balancer, a base station, an access point, or a similar device. In some implementations, network device 250 may receive data from IoT devices 220, with the assistance of mobile devices 230, as described in more detail elsewhere herein.

Network 260 includes one or more wired and/or wireless networks. For example, network 260 may include a cellular network (e.g., a long-term evolution (LTE) network, a 3G network, a code division multiple access (CDMA) network, or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
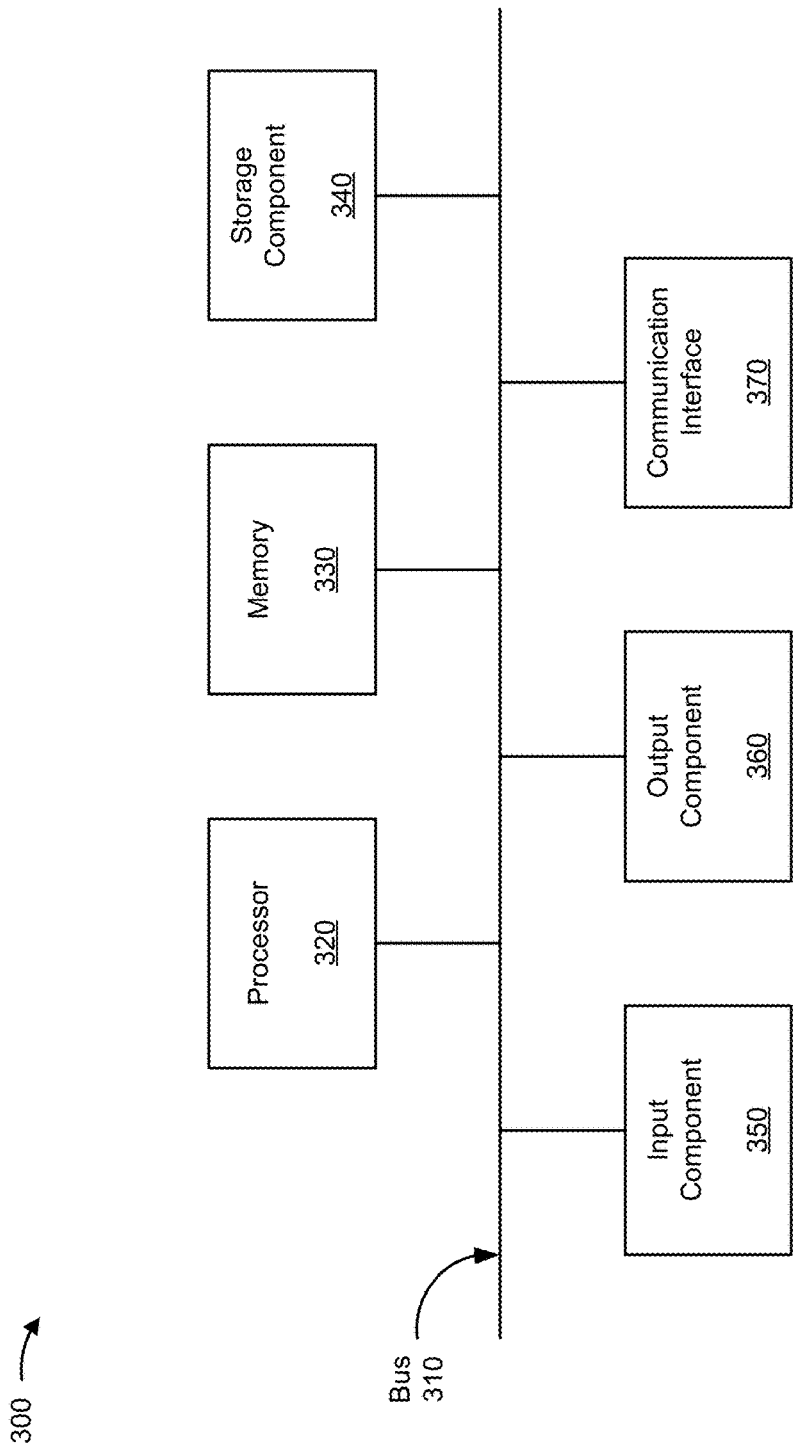
FIG. 3 is a diagram of example components of one or more devices of FIG. 2.

FIG. 3 is a diagram of example components of a device 300. Device 300 may correspond to provisioning device 210, IoT device 220, mobile device 230, management device 240, and/or network device 250. In some implementations, provisioning device 210, IoT device 220, mobile device 230, management device 240, and/or network device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for using mobile devices as IoT gateways for IoT devices. In some implementations, one or more process blocks of FIG. 4 may be performed by mobile device 230. In some implementations, one or more process blocks of FIG. 4 may be performed by another device or a group of devices separate from or including mobile device 230, such as provisioning device 210, IoT device 220, management device 240, and/or network device 250.

As shown in FIG. 4, process 400 may include receiving, from a management device, an offer to act as an IoT gateway (block 410). For example, mobile device 230 may receive, from management device 240, an offer to act as an IoT gateway for IoT device 220 (e.g., to receive and transfer data from and/or to IoT device 220). In some implementations, the offer may be a message sent, by management device 240, to mobile device 230.

In some implementations, the offer may include information indicating how mobile device 230 may act as an IoT gateway. For example, the offer may include location information and time information. In some implementations, the location information may identify a specified geographic location (e.g., an address or latitude and longitude information) that is within a communication range for IoT device 220 to communicate with mobile device 230. In some implementations, the time information may include a date, a time of day, a duration, or the like specifying when, and/or for how long, mobile device 230 will need to be at the specified geographic location to communicate with IoT device 220.

In some implementations, the offer may include information regarding incentives that may be provided if mobile device 230 accepts the offer and/or receives and transfers data from IoT device 220. For example, mobile device 230 may receive a reduced price for wireless services, a credit for additional minutes of data usage, a credit reducing prior minutes of data usage, free data service, a discount on a telecom bill, coupons or vouchers for goods and/or services, or the like.

In some implementations, the offer may include information regarding penalties that may be imposed if mobile device 230 declines the offer and/or fails to receive and transfer data from IoT device 220. For example, mobile device 230 may be receiving free data services based on mobile device 230 having agreed to periodically receive and transfer data from IoT device 220. If mobile device 230 declines the offer and/or fails to receive and transfer data from IoT device 220, mobile device 230 may lose the free data services or a quantity of free data services may be reduced for mobile device 230.

In some implementations, management device 240 may send an offer to particular mobile devices 230 that may be potential IoT gateways. For example, management device 240 may identify particular mobile devices 230 as potential IoT gateways for IoT device 220. Sending offers to particular mobile devices 230 that have been identified as potential IoT gateways, as opposed to indiscriminately sending offers to mobile devices 230, may reduce network resources consumed by sending offers for mobile devices 230 to act as IoT gateways.

In some implementations, management device 240 may identify mobile device 230 as a potential IoT gateway based on mobile device 230 having registered, with management device 240, to act as an IoT gateway. In some implementations, management device 240 may send offers to mobile devices 230 that have previously registered to act as IoT gateways. In some implementations, management device 240 may send offers to mobile devices 230 that have not previously registered to act as IoT gateways, but may register to act as an IoT gateway based on the offer and/or an incentive associated with the offer.

In some implementations, management device 240 may identify mobile device 230 as a potential IoT gateway based on a determination that mobile device 230 is near IoT device 220 (e.g., within a threshold distance of IoT device 220, within communication range of IoT device 220, or the like). In some implementations, management device 240 may determine that mobile device 230 is near IoT device 220 when mobile device 230 is close enough for communication with IoT device 220.

In some implementations, management device 240 may identify mobile device 230 as a potential IoT gateway based on a determination that mobile device 230 can or will be near IoT device 220 on a particular date and/or at a particular time (e.g., a day and/or time when IoT device 220 needs an IoT gateway). For example, if IoT device 220 is a meter, management device 240 may identify mobile device 230 as a potential IoT gateway, for IoT device 220, if mobile device 230 can be near IoT device 220 for a period of time on a particular date (e.g., at the end of a month).

In some implementations, management device 240 may identify mobile devices 230 as potential IoT gateways based on predicted mobility patterns for the mobile devices 230. In some implementations, a mobility pattern may be predicted for mobile device 230 based on predicted mobility for a user of mobile device 230. For example, a user of mobile device 230 may regularly follow particular routes (e.g., by using a particular route, at approximately the same time, on predictable days (e.g., a route to a place of employment, Monday through Friday)). Additionally, or alternatively, mobile device 230 may regularly be stationary at particular locations, at predictable times, and/or on predictable days (e.g., at the user's workplace (e.g., during working hours and on working days), at the user's residence (e.g., at night), or the like).

In some implementations, short-term and long-term mobility patterns may be predicted for a user and used to determine when the user (and the user's mobile device 230) may be near a particular location. For example, short-term (e.g., during a current day) mobility patterns may be predicted for a user (and the user's mobile device 230) based on the user's current position, speed, and direction of travel, which may be compared against map data (e.g., road and highway information). Long-term (e.g., daily, weekly, monthly, or the like) mobility patterns may be predicted based on user profiles (e.g., mobility profiles), schedules, calendars, or the like. In some implementations, mobility pattern predictions may be adjusted based on real-time information (e.g., weather, traffic, or the like), time dependent information (e.g., daily traffic patterns), or the like.

In some implementations, management device 240 may identify mobile devices 230 as potential IoT gateways based on comparing mobility patterns, associated with mobile devices 230, to data transmission schedules associated with IoT devices 220. For example, management device 240 may identify mobile device 230 as a potential IoT gateway for IoT device 220 when a mobility pattern associated with mobile device 230 indicates that mobile device 230 may be near IoT device 220 at a time when IoT device 220 is scheduled to transmit data.

Identifying mobile devices 230 as potential IoT gateways based on comparing mobility patterns to data transmission schedules may enable targeting offers, to act as an IoT gateway, to mobile devices 230 that may be more likely to accept the offer. For example, mobile device 230 may be more likely to accept an offer that may not require a large (e.g., as perceived by a user of mobile device 230) deviation from a preexisting mobility pattern. Targeting mobile devices 230 that are more likely to accept an offer to act as an IoT gateway, as opposed to indiscriminately sending offers without regard to a likelihood that the offer will be accepted, may reduce network resources consumed by sending offers that may be unlikely to be accepted.

In some implementations, management device 240 may identify a group of mobile devices 230 as potential IoT gateways for IoT device 220. In some implementations, management device 240 may assign, to mobile devices 230 in the group of mobile devices 230, scores based on (e.g., proportional or otherwise related to) a likelihood that each mobile device 230 will accept an offer. In some implementations, management device 240 may send offers to mobile devices 230 based on the scores. For example, management device 240 may send offers to mobile devices 230 that have scores that satisfy a threshold, to the Z mobile devices 230 that have the top Z scores (where Z is an integer greater than or equal to one), or the like.

Prior to sending offers to mobile devices 230, management device 240 may provide IoT device 220 with a device-specific key and/or a set of session tickets. By providing IoT device 220 with the device-specific key and/or the set of session tickets, management device 240 may shift some authentication, authorization, encryption, and/or decryption tasks from IoT device 220 to management device 240 to act as a trusted party. Shifting authentication, authorization, encryption, and/or decryption tasks away from IoT device 220 may conserve IoT device 220's computational, storage, communication, and/or power resources.

IoT device 220 may use the device-specific key for interactions with management device 240. In some implementations, management device 240 may generate the device-specific key as a symmetric key (e.g., for symmetric encryption). In some implementations, management device 240 may send the device-specific key to IoT device 220 (e.g., prior to IoT device 220 being placed into service). IoT device 220 may store (e.g., in a key store) the device-specific key. After IoT device 220 receives the device-specific key, IoT device 220 and management device 240 may mutually authenticate (e.g., handshake) each other. Based on the mutual authentication, IoT device 220 may trust management device 240 to perform authentication and authorization on behalf of IoT device 220. In some implementations, IoT device 220 and management device 240 may mutually authenticate each other based on the device-specific key.

IoT device 220 may use the session tickets to establish communication sessions with mobile devices 230 (e.g., mobile devices 230 that may be acting as IoT gateways for IoT device 220). In some implementations, IoT device 220 may use the session tickets to verify that mobile device 230 is authorized to act as an IoT gateway for IoT device 220.

In some implementations, management device 240 may generate and store the set of session tickets after IoT device 220 and management device 240 have mutually authenticated each other. Each session ticket may be a string of characters generated by management device 240. In some implementations, the session tickets may be random strings generated and/or obtained by management device 240. In some implementations, the session tickets may be generated based on IoT device 220 and/or the device-specific key that management device 240 generated for IoT device 220.

In some implementations, management device 240 may send the session tickets to IoT device 220. For example, management device 240 may provide the session tickets prior to IoT device 220 being placed into service. In some implementations, IoT device 220 may store the session tickets (e.g., in a key store).

In some implementations, the session tickets may expire based on a predetermined time-to-live (TTL). In some implementations, the predetermined TTL may be based on (e.g., shorter than) a time interval between windows during which IoT device 220 may wake up to transmit data. Session tickets that expire based on a predetermined TTL may prevent reuse of the session tickets and/or prevent replay attacks (e.g., attacks based on old session tickets), which may improve security for data obtained by IoT devices 220.

In some implementations, non-expiring session tickets may be used. For example, management device 240 may provide IoT device 220 with a permanent ticket or a finite number of non-expiring session tickets, which may be used in a circular key cycle. Using a permanent ticket or a finite number of non-expiring session tickets may reduce communication needs associated with providing, to IoT device 220, updated, new, and/or replacement session tickets.

In some implementations, IoT device 220 may receive the device-specific key and/or the session tickets via an intermittent (e.g., not always open) communication path. For example, management device 240 may send the device-specific key and/or the session tickets to provisioning device 210. Provisioning device 210 may send the device-specific key and/or the session tickets to IoT device 220, such as when provisioning device 210 is near IoT device 220.

In some implementations, IoT device 220 may periodically receive (e.g., from management device 240 and/or via provisioning device 210) updated, new, and/or replacement session tickets. For example, IoT device 220 may receive updated, new, and/or replacement session tickets daily, weekly, monthly, yearly, and/or based on another schedule.

As further shown in FIG. 4, process 400 may include sending, to the management device, an acceptance based on the offer (block 420). For example, mobile device 230 may send, to management device 240, a message indicating that mobile device 230 has accepted the offer and will act as an IoT gateway for IoT device 220. In some implementations, mobile device 230 may accept the offer by sending a mobile device key to management device 240, as discussed below with regard to block 440.

In some implementations, mobile device 230 may automatically accept the offer. For example, an application (e.g., a mobile app) on mobile device 230 may determine whether mobile device 230 will accept the offer (e.g., based on comparing the offer to a preexisting mobility pattern for mobile device 230, accepting all offers, accepting less than a threshold number of offers in a given time period, or the like). If the application determines that mobile device 230 will accept the offer, the application may cause mobile device 230 to automatically accept the offer and/or display instructions for compliance with the offer.

In some implementations, mobile device 230 may accept the offer at the discretion of a user of mobile device 230. For example, an application on mobile device 230 may cause mobile device 230 to accept the offer based on input from the user.

In some implementations, where mobile device 230 does not accept the offer (e.g., within a threshold time period), management device 240 may send another offer. For example, management device 240 may send a new offer (e.g., with different and/or additional incentives) to mobile device 230, to different mobile devices 230, and/or to additional mobile devices 230. In some implementations, management device 240 may resend the offer to mobile device 230, to different mobile devices 230, and/or to additional mobile devices 230.

As further shown in FIG. 4, process 400 may include receiving, from the management device, a dispatch message based on the acceptance (block 430). For example, mobile device 230 may receive, from management device 240, a dispatch message based on management device 240 having received the acceptance from mobile device 230.

The dispatch message may include information and/or instructions to enable mobile device 230 to act as an IoT gateway for IoT device 220. For example, the dispatch message may include information and/or instructions regarding mobile device 230 authenticating itself to management device 240 (as discussed below with regard to block 440), mobile device 230 authenticating management device 240 (as discussed below with regard to block 450), a location and time (e.g., for mobile device 230 to act as an IoT gateway for IoT device 220), mobile device 230 receiving a session ticket from management device 240 (as discussed below with regard to block 460), mobile device 230 establishing a session with IoT device 220 (as discussed below with regard to block 470), mobile device 230 obtaining data from IoT device 220 (e.g., receiving and recognizing the data, as discussed below with regard to block 480), and/or mobile device 230 relaying the data (e.g., for transmission via a network, as discussed below with regard to block 490). In some implementations, receipt of the dispatch message may cause mobile device 230 to display (e.g., to a user of mobile device 230) the information and/or instructions from the dispatch message and/or may cause mobile device 230 to configure itself (e.g., configure mobile device 230) to act as an IoT gateway for IoT device 220.

In some implementations, mobile device 230 may configure itself (e.g., based on receipt of the dispatch message) to act as an IoT gateway by activating a communication interface and/or starting an application. For example, mobile device 230 may activate mobile device 230's communication interface for low-power wireless communication (e.g., Bluetooth low energy, IEEE 802.15.4 ZigBee, or the like) to configure mobile device 230 for sending a session ticket to IoT device 220, establishing a session with IoT device 220, and/or receiving data from IoT device 220. In some implementations, mobile device 230 may start the application to configure mobile device 230 to receive data from IoT device 220 (e.g., via the communication interface for low-power wireless communication) and/or to relay the data (e.g., for transmission via a network, as discussed below with regard to block 490).

In some implementations, the location information may identify a specified geographic location (e.g., an address or latitude and longitude information) where mobile device 230 may act as an IoT gateway for mobile device 230. In some implementations, the time information may include a date, a time of day, a duration, or the like specifying when, and/or for how long, mobile device 230 will need to be at the specified geographic location to communicate with IoT device 220.

As further shown in FIG. 4, process 400 may include sending, to the management device, a mobile device key (block 440). For example, mobile device 230 may send a mobile device key to management device 240 to authenticate itself (e.g., to authenticate mobile device 230) to management device 240. In some implementations, the mobile device key may be a pre-configured password and/or a private key associated with mobile device 230.

In some implementations, mobile device 230 may send the mobile device key to management device 240 based on instructions in the dispatch message (e.g., after mobile device 230 has accepted the offer). In some implementations, mobile device 230 may send the mobile device key to management device 240 as an indication that mobile device 230 has accepted the offer (e.g., prior to mobile device 230 receiving the dispatch message).

In some implementations, management device 240 may authenticate mobile device 230 by comparing the mobile device key, received from mobile device 230, to a mobile device key stored by management device 240. For example, mobile device 230 and management device 240 may exchange a mobile device key as part of a process to register (e.g., with management device 240) mobile device 230 to act as an IoT gateway. In some implementations, management device 240 may generate the mobile device key, retain and store a copy of the mobile device key, and send a copy of the mobile device key to mobile device 230. In some implementations, mobile device 230 may provide, to management device 240, a copy of a mobile device key that mobile device 230 already possessed (e.g., a mobile device key generated by mobile device 230 or a mobile device key received, by mobile device 230, from a third party).

As further shown in FIG. 4, process 400 may include receiving, from the management device, a management device key (block 450). For example, mobile device 230 may receive a management device key from management device 240.

In some implementations, mobile device 230 may use the management device key to authenticate management device 240 (e.g., based on information and/or instructions in the dispatch message). In some implementations, the management device key may be a pre-configured password and/or a private key associated with management device 240. In some implementations, management device 240 may have received the management device key from a third party (e.g., a certificate authority) trusted by mobile device 230 and management device 240.

In some implementations, mobile device 230 may receive the management device key with the dispatch message. In some implementations, management device 240 may send the management device key to mobile device 230 based on management device 240 having authenticated mobile device 230 (e.g., based on the mobile device key).

As further shown in FIG. 4, process 400 may include receiving, from the management device, a session ticket (block 460). For example, mobile device 230 may receive a session ticket from management device 240.

In some implementations, mobile device 230 may receive a session ticket from management device 240 based on management device 240 having determined that mobile device 230 is authorized to act as an IoT gateway for IoT device 220. For example, based on mobile device 230 and management device 240 having authenticated each other (e.g., as described above with regard to block 440 and block 450), management device 240 may determine whether mobile device 230 is authorized to act as an IoT gateway for IoT device 220. In some implementations, management device 240 may determine that mobile device 230 is authorized to act as an IoT gateway for IoT device 220 based on mobile device 230 being identified in a record of permitted IoT gateways for IoT device 220. In some implementations, management device 240 may apply an authorization policy to determine whether mobile device 230 is authorized to act as an IoT gateway for IoT device 220.

In some implementations, management device 240 may send the session ticket to mobile device 230. For example, based on management device 240 having determined that mobile device 230 is authorized to act as an IoT gateway for IoT device 220, management device 240 may send, to mobile device 230, one of the session tickets that management device 240 generated for IoT device 220. In some implementations, the session ticket may be limited to a particular session (e.g., based on a predetermined time-to-live (TTL) for the session ticket) and to a particular one of IoT devices 220 (e.g., the IoT device 220 for which management device 240 generated the session ticket, and for which mobile device 230 is authorized to act as an IoT gateway).

As further shown in FIG. 4, process 400 may include sending, to an IoT device, the session ticket (block 470). For example, mobile device 230 may send the session ticket to IoT device 220 to establish a session, with IoT device 220, for mobile device 230 to receive data from IoT device 220. In some implementations, mobile device 230 may send the session ticket to IoT device 220 with a request for IoT device 220 to send data to mobile device 230. In some implementations, mobile device 230 may send the session ticket to IoT device 220 as the request for IoT device 220 to send data to mobile device 230.

In some implementations, mobile device 230 may determine (e.g., before sending the session ticket to IoT device 220) whether mobile device 230 is within a communication range for IoT device 220 to communicate with mobile device 230. For example, mobile device 230 may determine that mobile device 230 is at or near a geographic location (e.g., an address or latitude and longitude information) that was specified in the dispatch message. In some implementations, mobile device 230 may determine that mobile device 230 is within communication range for IoT device 220 based on mobile device 230 detecting a signal sent by IoT device 220. In some implementations, mobile device 230 may send a message (e.g., a message that includes the session ticket), to IoT device 220, based on mobile device 230 having determined that mobile device 230 is within communication range for IoT device 220.

When IoT device 220 receives the session ticket from mobile device 230, IoT device 220 may compare the received session ticket (e.g., a character string) against a set of stored session tickets (e.g., a set of stored character strings). For example, IoT device 220 may compare the session ticket that was received from mobile device 230 against the session tickets that IoT device 220 received from management device 240. If IoT device 220 determines that the session ticket received from mobile device 230 matches a session ticket that was generated by management device 240, IoT device 220 may determine that mobile device 230 is authorized to act as an IoT gateway for IoT device 220. In other words, IoT device 220 may determine that management device 240 has authenticated mobile device 230 and that management device 240 has authorized mobile device 230 to act as an IoT gateway for IoT device 220.

Enabling IoT device 220 to determine that mobile device 230 is an authorized IoT gateway based on comparing session tickets (e.g., based on comparing a character string against a set of stored character strings) may allow IoT device 220 to reduce time and resources (e.g., power and computational resources) consumed by IoT device 220 while determining that mobile device 230 is an authorized IoT gateway. Reducing the time consumed by IoT device 220 while determining that mobile device 230 is an authorized IoT gateway may preserve more time for IoT device 220 to transfer data to mobile device 230 (e.g., before mobile device 230 moves out of communication range with IoT device 220), which may increase data collection efficiency.

As further shown in FIG. 4, process 400 may include receiving data from the IoT device (block 480). For example, mobile device 230 may receive data from IoT device 220. In some implementations, mobile device 230 may receive the data from IoT device 220 on a communication interface for low-power wireless communication (e.g., Bluetooth low energy, IEEE 802.15.4 ZigBee, or the like). In some implementations, mobile device 230 may recognize the data as coming from IoT device 220 based on information and/or instructions in the dispatch message.

In some implementations, IoT device 220 may establish a session with mobile device 230 and send data (e.g., data gathered by IoT device 220) to mobile device 230 based on the session ticket received from mobile device 230 and IoT device 220 having determined that mobile device 230 is authorized to act as an IoT gateway for IoT device 220.

In some implementations, IoT device 220 may establish a session with mobile device 230 and send the data to mobile device 230 when mobile device 230 is within communication range for IoT device 220 to communicate with mobile device 230. For example, IoT device 220 may determine (e.g., before establishing a session with mobile device 230 and/or sending data to mobile device 230) whether mobile device 230 is within communication range. In some implementations, IoT device 220 may determine that mobile device 230 is within communication range based on IoT device 220 receiving a message from mobile device 230. In some implementations, IoT device 220 may determine that mobile device 230 is within communication range based on IoT device 220 having received the session ticket that mobile device 230 sent to IoT device 220.

In some implementations, after IoT device 220 has completed sending the data to mobile device 230, IoT device 220 may discard the stored session ticket that matches the session ticket that IoT device 220 received from mobile device 230. In some implementations, IoT device 220 may discard the session ticket based on the session ticket having reached a predetermined time-to-live (TTL). Discarding session tickets after use and/or after having reached a predetermined TTL may prevent replay attacks based on attempted reuse of a session ticket.

In some implementations, the data, sent by IoT device 220 to mobile device 230, may be unencrypted. Sending unencrypted data to mobile device 230 may prevent IoT device 220 from having to encrypt the data, which may conserve IoT device 220's potentially limited computational, storage, communication, and/or power resources. Sending unencrypted data may additionally prevent other devices from having to decrypt the data, which may further conserve computational, storage, communication, and/or power resources.

In some implementations, the data, sent by IoT device 220 to mobile device 230, may be encrypted. For example, prior to sending the data to mobile device 230, IoT device 220 may encrypt the data (e.g., using the device-specific key that IoT device 220 received from management device 240). Encrypting the data, before IoT device 220 sends the data to mobile device 230, may prevent mobile device 230 or a third party from having access to the data.

As further shown in FIG. 4, process 400 may include relaying, for transmission via a network, the data received from the IoT device (block 490). For example, mobile device 230 may relay, for transmission via network 260, the data received from IoT device 220. In some implementations, mobile device 230 may relay the data based on information and/or instructions in the dispatch message.

In some implementations, mobile device 230 may format the data for transmission via a communication interface other than the communication interface on which mobile device 230 received the data from IoT device 220. For example, mobile device 230 may receive the data, from IoT device 220, on a communication interface for low-power wireless communication (e.g., Bluetooth low energy, IEEE 802.15.4 ZigBee, or the like), format the data for transmission via another communication interface (e.g., for communication with a wireless network, such as network 260), and send the data to network device 250 via the other communication interface.

In some implementations, mobile device 230 may relay the data without locally storing the data (e.g., without non-transitorily storing the data on mobile device 230). For example, mobile device 230 may retransmit (e.g., to network device 250) the data upon receiving the data from IoT device 220.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, implementations described herein may enable dynamically and securely establishing a session between a mobile device and an IoT device. Dynamically and securely establishing a session between a mobile device and an IoT device may enable using mobile devices as IoT gateways for IoT devices, which may reduce the need for dedicated IoT gateways. Implementations described herein may shift some authentication, authorization, encryption, and/or decryption tasks from resource-constrained IoT devices to a management device to act as a trusted party. Shifting authentication, authorization, encryption, and/or decryption tasks to a management device may conserve the IoT device's potentially limited computational, storage, communication, and/or power resources. Implementations described herein may use precomputed session tickets to reduce the handshake time to establish a session between an IoT device and a mobile device that is acting as an IoT gateway. Reducing the handshake time may enable using a greater portion of the limited available connection time, between the mobile device and the IoT device, for data transfer, which may increase data collection efficiency. Implementations described herein may use session tickets that expire based on a predetermined time-to-live (TTL). Using session tickets that expire based on a predetermined TTL may prevent replay attacks based on reuse of the session tickets, which may improve data security.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A mobile device, comprising:
 a first communication interface;
 a second communication interface; and
 one or more processors to:
  receive, from another device, a dispatch message to receive data from an Internet of Things (IoT) device;
  send, to the other device and based on the dispatch message, a device key;
  receive, from the other device and based on the device key, a session ticket,
   the session ticket having been generated by the other device;
  send, to the IoT device, the session ticket;
  receive the data, from the IoT device and via the first communication interface, based on the IoT device having determined that the session ticket is included in a set of session tickets,
   the set of session tickets having been provided by the other device;
  format the data for transmission via the second communication interface; and
  send, via the second communication interface, the data to a network device.

2. The mobile device of claim 1,
 where the one or more processors, when receiving the data from the IoT device, are to:
  receive unencrypted data from the IoT device.

3. The mobile device of claim 1, where the one or more processors, when receiving the session ticket, are to:
 receive the session ticket based on the mobile device having been determined, by the other device and prior to the mobile device receiving the session ticket, to be authorized to receive the data from the IoT device.

4. The mobile device of claim 1,
 where the one or more processors are further to:
  determine, before sending the session ticket to the IoT device, when the mobile device is within a communication range for the IoT device; and
 where the one or more processors, when sending, to the IoT device, the session ticket, are to:
  send, to the IoT device, the session ticket when the mobile device is within the communication range for the IoT device.

5. The mobile device of claim 1,
 where the session ticket has a time-to-live, and
 where the session ticket is to expire after expiration of the time-to-live.

6. The mobile device of claim 1, where the one or more processors are further to:
 receive, from the other device and before receiving the dispatch message, an offer to receive the data from the IoT device;
 determine, before receiving the dispatch message, that the offer should be accepted; and
 send, to the other device and before receiving the dispatch message, an acceptance based on the offer,
  the dispatch message being based on the acceptance.

7. The mobile device of claim 1,
 where the device key is a first device key; and
 where the one or more processors are further to:
  receive a second device key from the other device; and
  authenticate the other device based on the second device key.

8. A non-transitory computer-readable medium storing instructions, the instructions comprising:
 one or more instructions that, when executed by one or more processors of a device, cause the one or more processors to:
  receive, from another device, an offer to receive data from an Internet of Things (IoT) device;
  send, to the other device and based on the offer, a device key;
  receive a session ticket from the other device and based on the device key having been sent to the other device,
   the session ticket having been generated by the other device;
  send, to the IoT device, the session ticket;
  receive the data, from the IoT device, based on the IoT device having determined that the session ticket is included in a set of session tickets,
   the set of session tickets having been provided by the other device, and
   the data being received, from the IoT device, via a first communication interface;
  format the data for transmission via a second communication interface; and
  send, via the second communication interface, the data to a network device for transmission via a network.

9. The non-transitory computer-readable medium of claim 8,
 where the device key is a first device key; and
 where the one or more instructions, when executed by the one or more processors, further cause the one or more processors to:
  receive a second device key from the other device; and
  authenticate the other device based on the second device key.

10. The non-transitory computer-readable medium of claim 8,
 where the session ticket has a time-to-live, and
 where the session ticket is to expire after expiration of the time-to-live.

11. The non-transitory computer-readable medium of claim 8, where the one or more instructions, that cause the one or more processors to receive the data from the IoT device, cause the one or more processors to:
 receive the data, from the IoT device, when the device is within a communication range of the IoT device.

12. The non-transitory computer-readable medium of claim 8,
 where the device receives the session ticket based on the device having been determined, by the other device and prior to the device receiving the session ticket, to be authorized to receive the data from the IoT device.

13. The non-transitory computer-readable medium of claim 8,
 where the one or more instructions, when executed by the one or more processors, further cause the one or more processors to:
  receive, from the other device and before sending the device key to the other device, a dispatch message to receive the data from the IoT device; and where the one or more instructions, that cause the one or more processors to receive the data from the IoT device, cause the one or more processors to:
receive the data, from the IoT device, based on the dispatch message.

14. The non-transitory computer-readable medium of claim 8,
where the data, prior to being received from the IoT device, had been encrypted by the IoT device to prevent access to the data by the device.

15. A method, comprising:
receiving, by a mobile device and from another device, a dispatch message to receive data from an Internet of Things (IoT) device;
sending, by the mobile device, to the other device and based on the dispatch message, a device key;
receiving, by the mobile device, from the other device and based on the device key, a session ticket,
the session ticket having been generated by the other device;
sending, by the mobile device, the session ticket to the IoT device;
configuring, by the mobile device, the mobile device to receive the data from the IoT device;
receiving, by the mobile device and after configuring the mobile device, the data from the IoT device based on the IoT device having determined that the session ticket is included in a set of session tickets,
the set of session tickets having been provided by the other device, and
the data having been received, from the IoT device, via a first communication interface;
formatting the data for transmission via a second communication interface; and
sending, via the second communication interface, the data to a network device.

16. The method of claim 15,
where the session ticket has a time-to-live, and
where the session ticket is to expire after expiration of the time-to-live.

17. The method of claim 15,
where sending the session ticket to the IoT device comprises:
sending the session ticket to the IoT device when the mobile device is within a communication range for the IoT device; and
where receiving the data from the IoT device comprises:
receiving the data from the IoT device when the mobile device is within the communication range for the IoT device.

18. The method of claim 15, further comprising:
receiving, from the other device and before receiving the dispatch message, an offer to receive the data from the IoT device;
determining, before receiving the dispatch message, that the offer should be accepted; and
sending, to the other device and before receiving the dispatch message, an acceptance based on the offer,
the dispatch message being based on the acceptance.

19. The method of claim 15,
where the mobile device receives the session ticket from the other device based on the other device having determined, based on the device key and prior to the mobile device receiving the session ticket, that the mobile device is authorized to receive the data from the IoT device.

20. The method of claim 15, where receiving the data from the IoT device comprises:
receiving unencrypted data from the IoT device.

* * * * *